United States Patent
Watanabe et al.

(10) Patent No.: US 6,489,062 B1
(45) Date of Patent: Dec. 3, 2002

(54) NON-AQUEOUS ELECTROLYTE SECONDARY BATTERY HAVING HEAT-RESISTANT ELECTRODES

(75) Inventors: Shunji Watanabe, Chiba (JP); Shinichi Takasugi, Chiba (JP); Hideharu Onodera, Chiba (JP); Toyoo Harada, Chiba (JP); Tsugio Sakai, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/465,078

(22) Filed: Dec. 16, 1999

(30) Foreign Application Priority Data

Dec. 24, 1998 (JP) .......................... 10-367881
Dec. 24, 1998 (JP) .......................... 10-367882
Dec. 24, 1998 (JP) .......................... 10-367884
Sep. 8, 1999 (JP) .......................... 11-254920

(51) Int. Cl.[7] ................. H01M 4/40; H01M 2/14
(52) U.S. Cl. ................. 429/231.95; 429/231.1; 429/231.5
(58) Field of Search ................. 429/223, 231.95, 429/231.5, 129, 231.1; 29/623.1

(56) References Cited

U.S. PATENT DOCUMENTS

| | | | | |
|---|---|---|---|---|
| 4,601,919 A | * | 7/1986 | Asami | 427/126.3 |
| 5,075,990 A | * | 12/1991 | Greenberg | 38/44 |
| 5,294,499 A | * | 3/1994 | Furukawa | 429/164 |
| 5,545,468 A | * | 8/1996 | Koshiba | 429/218 |
| 5,601,952 A | * | 2/1997 | Dasgupta | 429/224 |
| 5,624,771 A | * | 4/1997 | Sano | 429/173 |
| 6,057,058 A | * | 5/2000 | Koshiba | 429/224 |
| 6,274,271 B1 | * | 8/2001 | Koshiba | 429/231.1 |
| 6,274,277 B1 | * | 8/2001 | Mori | 429/307 |

FOREIGN PATENT DOCUMENTS

| | | | | | |
|---|---|---|---|---|---|
| JP | 361263069 A | * | 11/1986 | | H01M/10/40 |
| JP | 08178871 | * | 1/1998 | | H01M/4/58 |
| JP | 10027626 | * | 1/1998 | | H01M/4/58 |
| JP | 10027627 | * | 1/1998 | | H01M/4/58 |
| JP | 2000243454 | * | 9/2000 | | H01M/2/16 |

* cited by examiner

*Primary Examiner*—Patrick Ryan
*Assistant Examiner*—Mark Ruthkosky
(74) *Attorney, Agent, or Firm*—Adams & Wilks

(57) ABSTRACT

A non-aqueous electrolyte secondary battery capable of withstanding a reflow temperature has a positive electrode having a conductive material, a binder, and an electrode active material selected from the group consisting of $LiCoO_2$, $LiNiO_2$ and $LiMn_2O_4$. A negative electrode has a conductive material, a binder and an electrode active material selected from the group consisting of a titanium oxide having an anatase structure, lithium titanate having a spinel structure and a molybdenum oxide. An electrolyte has a supporting salt and a non-aqueous solvent having a boiling point greater than 200° C. A gasket is comprised of a material having a heat deformation temperature greater than 230° C. A separator is disposed between the positive electrode and the negative electrode and is comprised of a material having a heat deformation temperature greater than 230° C. At least one of the positive electrode and the negative electrode comprises an electrode heat-treated to a temperature of 250° C. to 450° C. for deactivating a thermally active portion of each of the conductive material, the binder and the electrode active material thereof.

24 Claims, 3 Drawing Sheets

NON-AQUEOUS ELECTROLYTE SECONDARY BATTERY HAVING HEAT-RESISTANT ELECTRODES

BACKGROUND OF THE INVENTION

1. Field of the Invention

This invention relates to a coin type (button type) non-aqueous electrolyte secondary battery using a material capable of storing and emitting lithium as an active material for both negative and positive electrodes, and a lithium ion-conductive non-aqueous electrolyte.

2. Background of the Invention

The coil type (button type) non-aqueous electrolyte secondary battery according to the prior art has the features that it has a high energy density and is light in weight. Because of such features, the application of the coin type non-aqueous electrolyte secondary battery to a back-up power source for appliances has been increasing.

Almost all the conventional coil type (button type) non-aqueous electrolyte secondary batteries have to add lithium in any form to an active material of a negative electrode. In the case of a battery using a lithium-aluminum alloy for the negative electrode and a 3 V-class lithium-containing manganese oxide for the positive electrode, for example, it has been necessary to press-bond lithium to aluminum of the negative electrode. In the case of a battery using carbon for the negative electrode and the 3 V-class lithium-containing manganese oxide for the positive electrode, it has been necessary to electrochemically introduce lithium to the negative electrode.

In the batteries of the kind described above, the material of a gasket for keeping air- and gas-tightness of the battery and insulation between the positive and negative electrodes is of utmost importance. Economical polypropylene has been used in the past as the material of the gasket because it is excellent in chemical resistance, flexibility and creep resistance, has high moldability and can be injection-molded.

When the battery is used mainly as the memory back-up power source, the battery is soldered in most cases to a printed substrate together with a memory device after terminals for soldering are welded to the battery. This soldering to the printed substrate has been conducted conventionally by using a soldering iron. However, as a greater number of electronic components are required to be mounted inside the same area of the printed substrate with scale-down or higher functions of appliances, it has become more and more difficult to secure the space into which the soldering iron is inserted. Automation of the soldering work itself has been required in order to reduce the cost of the soldering work.

Therefore, a method has been developed which applies in advance a solder cream, or the like, to soldered portions on the printed substrate, mounts the components onto such portions or supplies a small solder ball to each portion after the components are mounted, and passes the printed substrate assembly having the components mounted thereto through a furnace of a high temperature atmosphere set to 200 to 300° C., for example, so that the soldered portions reach a temperature higher than the melting point of the solder so as to fuse the solder and to thereby execute soldering (hereinafter called "reflow soldering"). The coin type (button type) non-aqueous electrolyte secondary battery having the conventional construction involves the drawback that the function of the battery is lost at the time of reflow soldering because the battery does not use the materials in consideration of the heat resistance.

Because almost all the conventional coin type (button type) non-aqueous electrolyte secondary batteries need to add lithium in any form to the active materials of the negative and positive electrodes during the production process as described above, the production method has to use the lithium metal which is difficult to handle.

When lithium is added in any form to the active materials of the negative and positive electrodes during the production process, the secondary battery lacks stability in reflow soldering.

In a coin type (button type) non-aqueous electrolyte secondary battery using a 3 V-class lithium-containing manganese oxide $Li_4Mn_5O_{12}$ for the positive electrode and an lithium-aluminum alloy for the negative electrode, for example, the electrolyte and the lithium alloy react with each other during reflow soldering in almost all combinations of the electrolytes and heat-resistant battery members, and invite drastic swell and rupture.

In another coin type (button type) non-aqueous electrolyte secondary battery using the 3 V-class lithium-containing manganese oxide $Li_4Mn_5O_{12}$ for the positive electrode and carbon, with which lithium is brought into contact or in to which lithium is doped electrochemically, for the negative electrode, too, the electrolyte and the negative plated doped with lithium react with reach other and invite drastic swell and rupture.

In the conventional coin type (button type) non-aqueous electrolyte secondary battery, all of the electrolyte, the separator and the gasket cannot withstand the reflow temperature. Therefore, boiling and fusion develop.

Even when the material is changed to a heat-resistant material for each of the electrodes and other members, a battery capable of coping with the reflow temperature cannot be fabricated. Though the problem of swell and rupture at the reflow temperature can be solved, another problem occurs that the battery characteristics get extremely deteriorated.

For, even though the material may seem stable, the combination of such materials is not so selected as to achieve the highest stability and performance.

SUMMARY OF THE INVENTION

In order to solve the problems described above, it is an object of the present invention to provide a battery capable of exhibiting satisfactory characteristics even after reflow soldering, by employing all of the following means for improvement.

(1) Heat-resistant Electrodes and Members are Selected.

The battery of the present invention uses a positive electrode active material formed of $LiCoO_2$, $LiNiO_2$ or $LiMn_2O_4$, each being an oxide containing mobile lithium. Anatase type titanium oxide ($TiO_2$), lithium titanate having a spinel structure or a molybdenum oxide is used for the negative electrode.

$LiCoO_2$, $LiNiO_2$ and $LiMnO_4$ as the oxide containing mobile lithium, anatase type titanium oxide and spinel type lithium titanate are difficult to invite a drastic reaction at the reflow temperature. Therefore, in order to obtain a battery that allows reflow soldering, heat-resistant materials are used for the electrolyte, the separator and the gasket as the constituent elements of the battery.

(2) Heat Stability of the Electrode Active Materials is Further Improved.

As a result of various studies conducted so as to improve stability of the electrode active materials, it has been found that the highest stability can be achieved at the reflow temperature by reducing the quantity of dust.

(3) Degradation of Battery Characteristics is Restricted by Heat-treatment of the Electrodes.

Electrodes comprising the electrode active material, a conduction adjuvant and an organic binder are heat-treated at 200 to 450° C. Consequently, the active portions of the active material, organic binder and conduction adjuvant (dust, non-reacted portions during synthesis, etc.) are rendered inactive, and wettability between the electrolyte and the electrode is improved. Because the electrolyte having particularly high stability has a high viscosity and does not easily permeate into the electrode, the combined effect with the heat-treatment is great.

The optimum combination of these technical means gives the coin type (button type) non-aqueous electrolyte secondary battery capable of withstanding the reflow temperature.

(4) The Best Combination is Searched in the Selection of the Electrolyte and the Heat-resistant Members.

These and other features of the present invention will become more apparent from the following description when taken in conjunction with the accompanying drawings.

DETAILED DESCRIPTION OF THE PREFERRED EMBODIMENTS

Figure 1:
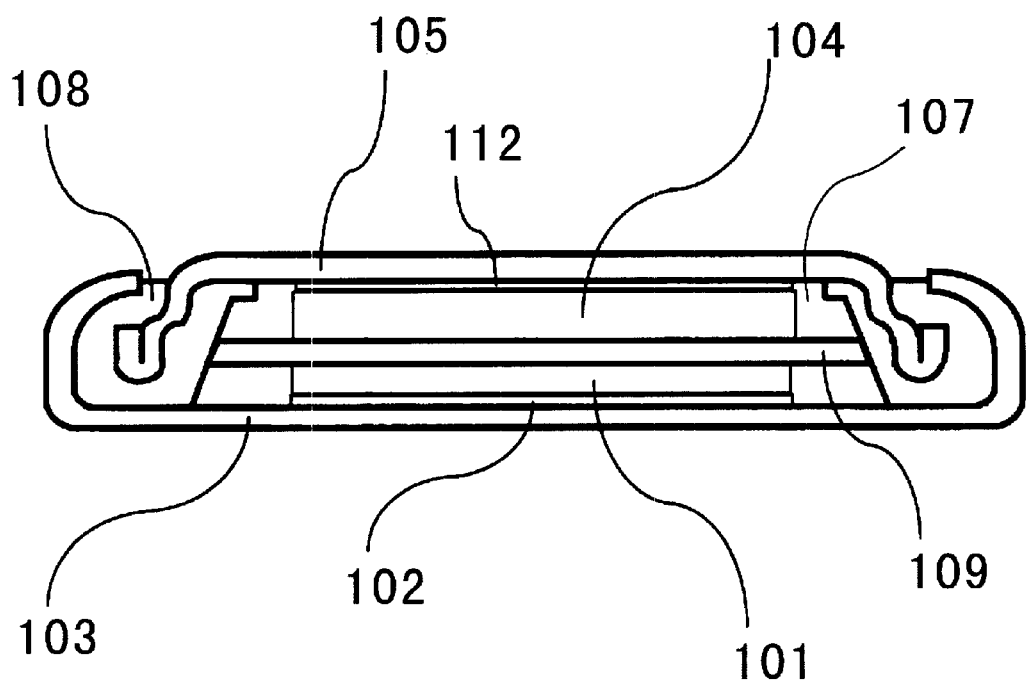
FIG. 1 is a sectional view of a coin type lithium secondary battery according to the present invention.

Since $LiCoO_2$, $LiNiO_2$ or $LiMn_2O_4$ as the oxide containing mobile lithium is used, it is not necessary to add lithium to the active material during the production process. When $LiCoO_2$ is used for the positive electrode, an initial voltage is about 3 V/vs Li. When a voltage is applied (charging), lithium migrates and the voltage rises to 4 V/vs Li. When anatase type titanium oxide, spinel type lithium titanate or the molybdenum oxide is used for the negative electrode in such a manner as to adsorb lithium so migrating, a battery having a battery voltage of 3 to 2 V can be fabricated.

It has been confirmed through experiments that when the lithium-aluminum alloy or carbon with which lithium is brought into contact or into which lithium is doped electrochemically, or the oxide, is used for the negative electrode, the electrolyte and the negative electrode cause the drastic reaction at the reflow temperature exceeding 200° C. (In the case of the negative electrode using carbon having lithium in contact therewith or doped electrochemically with lithium, or the oxide, however, the reaction can be suppressed at the reflow temperature by reducing the amount of lithium to be doped, but at the sacrifice of the capacity.) It has been found that $LiCoO_2$, $LiNiO_2$ or $LiMn_2O_4$ as the oxide that is caused to contain in advance lithium, by firing, etc, in the synthesis process of the starting material, does not drastically react with the electrolyte even at the reflow temperature.

Therefore, the present invention uses, as the electrodes, the positive electrode active material consisting of $LiCoO_2$, $LiNiO_2$ or $LiMn_2O_4$ containing mobile lithium and the negative electrode active material consisting of anatase type titanium oxide, spinel type lithium titanate or a molybdenum oxide. In consequence, the present invention need not rely on the negative electrode of a lithium alloy, which is unstable at the reflow temperature, or on carbon having lithium in contact therewith or doped electrochemically with lithium, as the lithium source of lithium that migrates during charge and discharge.

It has been confirmed that $LiCoO_2$, $LiNiO_2$ or $LiMn_2O_4$ that is used as the positive electrode active material is the oxide that contains mobile lithium and is stable at the reflow temperature.

Cobalt and nickel can be processed into a composite, and may be formed in the form of $LiCo_xNi_yO_2$. Furthermore, it is possible to replace a part of cobalt or nickel by B, P, Si and Mg.

On the other hand, the oxide used as the negative electrode active material is the one that has an electrode potential approximate to 1.5 to 2.5 V.

Anatase type titanium oxide, spinel type lithium titanate or the molybdenum oxide according to the present invention is stable at the reflow temperature, can reversibly absorb and emit lithium, and has a lower potential than the positive electrode active material.

Compounds having other structure may be contained in these negative electrode materials in the form of the mixture or the mixed crystal. In the synthesis of anatase type titanium oxide and spinel type lithium titanate by firing, for example, rutile type titanium oxide is formed when the firing temperature is raised so as to increase the degree of crystallization. The content of this rutile type titanium oxide is preferably not greater than 50% in consideration of the drop of the capacity.

The active materials used for the positive and negative electrodes in the present invention all have flat charge-discharge curves. Therefore, relatively flat charge-discharge curves can be accomplished when the battery is constituted by using such materials, and the battery can cope with low voltage ICs developed in recent years. Recent types of ICs have a small width of wiring in order to improve the integration density. Therefore, the withstand voltage of the ICs has dropped recently to about 2.5 to 2.7 V, though it has been at least 3 V in the past. In the discharge, however, the operation is guaranteed to only 2.0 to 1.8 V in most cases, and in this point, no difference exists substantially in the ICs having the conventional withstand voltage. To operate such ICs, a battery is necessary that can be charged at 2.5 to 2.7 V and can secure a sufficient capacity at the discharge of 2.0 to 1.8 V. The non-aqueous electrolyte secondary battery according to the present invention is most suitable for such an application because it has a flat charge-discharge curve.

The mean potential of anatase type titanium oxide is 1.8 V vs Li. By combining it with a 4 V/vs Li type, a battery capable of being charged at about 2.5 V can be fabricated, and this battery is most suitable for the application of operating a low voltage IC. On the other hand, the mean potential of spinel type lithium titanate is 1.5 V vs Li. When it is combined with a 4 V/vs Li type positive electrode, a battery capable of charging at about 3 V can be fabricated, and such a battery can be applied to an IC having a 3 V withstand voltage.

The molybdenum oxide $MoO_x$ can be used within the range of $2 \leq x \leq 3$. The closer the x value to 2, the lower becomes the potential, and the closer the x value to 3, the higher becomes the potential. Recently, a broad range of the charging voltage and output voltage of the battery is required depending on setting of appliances that use the battery. Since the battery voltage is determined by the potential difference between the positive electrode and the negative electrode, the charge voltage as well as the output voltage can be regulated by changing the x value of the molybdenum oxide $MoO_x$ as the negative electrode.

The positive electrode active material and the negative electrode active material described above do not invite the drastic reaction at the reflow temperature and are stable. However, it has been found that the following measures must be taken in order to stabilize further the battery characteristics. The first is to minimize the dust contained in the electrode active material. Experiments have revealed that anatase type titanium oxide and spinel type lithium titanate preferably have a mean particle diameter of at least 5 $\mu$m and they do not contain more than 50% of the particles having a particle diameter of smaller than 5 $\mu$m. In the case of $LiCoO_2$, $LiNiO_2O_2$, the molybdenum oxide or $LiMn_2O_4$, experiments have revealed also that the mean particle size is preferably at least 10 $\mu$m and these compounds do not preferably contain more than 50% of the particles smaller than 10 $\mu$m. When the mean particle size is not greater than 5 $\mu$m or when the compounds contain more than 50% of the particles smaller than 5 $\mu$m, the active material and the electrolyte drastically react with each other and the battery undergoes swelling in some cases. However, even when a considerable amount of the dust is contained, the adverse influences on the battery can be reduced by conducting heat-treatment, as will be described below.

The second requisite is the heat-treatment of the to electrode. The heat-treatment temperature of the electrode is preferably from 200 to 450° C., particularly preferably from 250 to 350° C. The improvement of the battery characteristics can hardly be observed below 200° C. At a temperature higher than 350° C., on the other hand, the battery characteristics can be improved, it is true, but decomposition of the organic binder proceeds so excessively that the strength of the electrode itself drops and shape retention becomes rather difficult.

The effect of the heat-treatment can be confirmed when the retention time is at least 30 minutes. The heat-treatment time is decided in accordance with the desired effect and the production cost in consideration of the size of a heat-treatment furnace and the processing amount of the electrode. It is preferably from 30 minutes to 20 hours.

The heat-treatment is preferably effected by using hot air, a heater, infrared rays, far infrared rays, electron beams, low temperature wet air, etc, and these means may be used either individually or in combination. The heat-treatment atmosphere may be open air, oxygen, vacuum and inert gas atmosphere, and they are selected in accordance with the kind of the electrode. In the case of $LiMn_2O_4$, the heat-treatment in open air or in an atmosphere having a high oxygen concentration provides better results. If the temperature is raised excessively in the open air atmosphere or in the atmosphere having a high oxygen concentration, however, the organic binder is burnt or A-oxidation of the conduction adjuvant occurs, inviting the drop of the battery characteristics in some cases. Therefore, specific attention must be paid in such a case.

The effect of the heat-treatment is brought forth presumably because the active portions of the active material, the organic binder and the conduction adjuvant (such as the dust and non-reacted portions during synthesis) are changed and rendered inactive and become stable even at the reflow temperature due to the heat-treatment. Heating at a temperature higher than 200° C. gives a great change to the organic materials. Wettability of the organic binder with the electrolyte can be greatly improved by the heat-treatment. For, decomposition starts occurring around 200° C., and the functional groups on the surface of the organic binder are modified, or a part of the organic binder is decomposed into the porous materials.

The heat-treatment can be applied most effectively to both of the positive and negative electrodes. When the material the characteristics of which are likely to change upon heating is used, however, the heat-treatment is applied to only the electrode in which the characteristics do not change easily, and this electrode gets impregnated with a greater amount of the electrolyte.

In order to withstand reflow soldering, the electrolyte must comprise a heat-resistant non-aqueous solvent having a boiling point of not lower than 200° C. at a normal pressure. Propylene carbonate (PC), ethylene carbonate (EC) and γ-butyrolactone (γBL) used for the electrolyte having a boiling point of not lower than 200° C. at a normal pressure have a higher viscosity than those solvents which have a low boiling point, and have low impregnation property to the electrode. When the electrolyte containing these solvents is used, the battery characteristics are not satisfactory, and a long time must be secured during the production process in order to let the electrode be impregnated with the electrolyte. If the electrode is heat-treated in advance at a temperature not lower than 200° C. as in the present invention, however, wettability with the electrolyte can be drastically improved, and the battery characteristics can be improved, too.

The reflow temperature rises to or above about 250° C. in some cases. Nonetheless, rupture of the battery does not occur even when γ-butyrolactone (γBL) having a boiling point of 204° C. at a normal pressure is used presumably because the pressure inside the battery rises at that temperature. A good result can be obtained by using a solvent selected from propylene carbonate (PC), ethylene carbonate (EC) and γ-butyrolactone (γBL) either individually or as a mixture in the combination of the positive and negative electrodes.

Lithium hexafluorophosphate ($LiPF_6$), lithium borofluoride ($LiBF_4$) and lithium trifluoromethasulfonate ($LiCF_3SO_3$) as the supporting salt containing fluorine are more stable both thermally and electrically than chlorine type supporting salts such as $LiClO_4$.

In the combination of the positive and negative electrodes in the present invention, in particular, an electrolyte prepared by adding 1 mol/l of $LiBF_4$ to a 1:1 mixed solvent of ethylenecarbonate (EC) and γ-butyrolactone (γBL) gives the best result.

A film having high ion permeability, a predetermined mechanical strength and insulation property is used as the separator. A glass fiber can be used most stably for reflow soldering, and resins such as polyphenylene sulfide, polyethyelen terephthalate, polyamide and polyimide having a heat deformation temperature of 230° C. or above can be used, too. The pore diameter of the separator falls within the range that is generally used for the batteries. For example, the pore diameter is from 0.01 to 10 $\mu$m. The thickness of the separator falls within the range used generally for the batteries, for example, 5 to 300 $\mu$m.

Generally, polypropylene is used for the gasket, too. When reflow soldering is conducted, the resins having a heat deformation temperature of 230° C. or above such as polyphenylene sulfide, polyethylene terephthalate and polyamide are free from the rupture at the reflow temperature. Moreover, the problem such as the leak of the electrolyte due to the deformation of the gasket does not occur during preservation after reflowing.

In addition, it is possible to use a polyether ketone resin, a polyether ether ketone resin, a polyarylate resin, a polybutylene terephthalate resin, a polycyclohexanedimethylene terephthalate resin, a polyethersulfone resin, a polyaminobis-maleimide resin, and a polyetherimide resin. The results of experiments reveal that substantially similar effects can be obtained by adding up to about 10 wt % of a glass fiber, a mica whisker, ceramic dust, etc, to the materials described above.

The shape of the gasket becomes stable when it is heat-treated at around 250° C. for several hours before assembling the battery. In this way, even when reflow soldering is conducted, the gasket does not undergo remarkable shrinkage, and the leak of the electrolyte does not occur, either.

In the present invention, the best result can be obtained by heat-treating the gasket of polyphenylene sulfide containing 5% glass fiber at 250° C. for two hours.

When the battery has a coin or button shape, the electrode has a pellet shape by compressing the compound of the positive electrode active material and the compound of the negative electrode active material into the pellet. When the battery has a thin coin or button shape, the electrode molded into a sheet may be punched out. The thickness of the pellet and its diameter are determined in accordance with the size of the battery.

Ordinary methods can be used as a method of pressing the pellet, but a mold pressing method is preferred. The press pressure is not particularly limited but is preferably from 0.2 to 5 t/cm$^2$. The press temperature is preferably from room temperature to 200° C.

An electrically conductive agent, a binder, a filler, and the like, can be added to the electrode compound. The kind of the conductive agent is not limited, in particular. Though metal powder can be used, a carbon type is particularly preferred. The carbon materials are most ordinary, and their examples include natural graphite (scale graphite, scale-like graphite, mud graphite), artificial graphite, carbon black, channel black, thermal block, furnace black, acetylene black, carbon fibers, and so forth. As to the metal, metal powder of copper, nickel, silver, etc, and their metal fibers are used. Conductive polymers can be used, too.

The addition amount of carbon and the mixing ratio vary with the conductivity, the electrode shape, and so forth, and are not particularly limited. It is preferably from 1 to 50 wt %, particularly preferably from 2 to 40 wt %, in the case of the negative electrode.

The organic binder is preferably insoluble in the electrolyte, but is not particularly limited.

The organic binder is generally and preferably at least one of polysaccharides, thermoplastic reins, thermosetting resins, polymers having rubber elasticity, etc, or their mixtures. Their examples include polyacrylic acid, a neutralizate of polyacrylic acid, polyvinyl alcohol, carboxymethyl cellulose, starch, hydroxypropyl cellulose, regenerated cellulose, diacetyl cellulose, polyvinyl chloride, polyvinyl pyrrolidone, tetrafluoroethylene, polyvinylidene fluoride, polyethylene, polypropylene, ethylene-propylene-diene polymer (EPDM), sulfonated EPDM, styrene-butadiene rubber, polybutadiene, fluorocarbon resin, fluororubber, polyethylene oxide, polyimide, epoxy resin, phonols, and so forth. The addition amount of the binder is not limited, in particular, but is preferably from 1 to 50 wt %.

When an electrode using polyacrylic acid is heat-treated and used in the present invention, better results can be obtained. Polyacrylic acid is preferably of a cross-linking type. Because it forms a three-dimensional structure, it exhibits a strong bonding strength as the binder. Therefore, polyacrylic acid provides a sufficient effect even when its addition amount is small. When heat-treated at 200° C. or above, the properties of polyacrylic acid are changed and its wettability can be drastically improved with the electrolyte prepared by adding lithium borofluoride (LiBF$_4$) to ethylene carbonate (EC) or γ-butyrolactone (γBL).

Generally, since polyacrylic acid is highly hygroscopic, dehumidification management of the electrode pellets after molding is difficult to practice. Since heat-treated polyacrylic acid has no longer hygroscopicity, pellet preservation management can be made advantageously.

A metal plate having small resistance is preferred as the current collector of the electrode active material. Besides stainless steel, nickel, aluminum, titanium, tungsten, gold, platinum and fired carbon, aluminum or stainless steel having carbon, nickel, titanium or silver processed to the surface thereof is used for the positive electrode. Dual-phase stainless steel is effective for corrosion as the stainless steel. Nickel plating is generally applied to the outside of the battery in the case of the coin and button batteries. Examples of the treatment methods include wet plating, dry plating, CVD, PVD, cladding by press bonding, and application-coating.

Besides stainless steel, nickel, copper, titanium, aluminum, tungsten, gold, platinum and fired carbon, copper or stainless steel having carbon, nickel, titanium or silver processed to the surface thereof, or Al—Cd alloy, is used as the material for the negative electrode. Examples of the treatment methods include wet plating, dry plating, CVD, PVD, cladding by pressure bonding, application-coating, and so forth.

The electrode active material and the current collector can be fixed by an electrically conductive adhesive. The electrically conductive paste is prepared by dissolving a resin in a solvent and adding powder or fiber of carbon or metal, or by dissolving a conductive polymer in a solvent.

In the case of the pellet-like electrode, the conductive paste is applied between the current collector and the electrode pellet so as to fix the electrode. In this case, the conductive adhesive contains a heat-setting resin in many cases.

In the case of the coin or button battery, a sealing agent consisting of at least one member selected from the group consisting of asphalt pitch, butyl rubber, fluorine type oil, chlorosulfonated polyethylene and epoxy resin, or their mixtures, is applied between the gasket and the positive/negative electrode can. When the sealing agent is transparent, it is often colored so that the presence/absence of its application can be clearly confirmed. The application method of the sealing agent includes pouring of the sealing agent into the gasket, application to the positive/negative electrode can, dipping of the gasket into the sealant solution, and so forth.

The application of the non-aqueous electrolyte secondary battery according to the present invention is not particularly limited, and includes, for example, the back-up power source for cellular telephones and pagers, the power source for wrist watches having a generation function, and so forth.

The battery according to the present invention is preferably assembled in a de-humidified atmosphere or in an inert gas atmosphere. The components to be assembled, too, are preferably dried in advance. The moisture content is preferably 2,000 ppm or below in the battery as a whole. When the moisture content is not greater than 50 ppm for each of the positive/negative electrode compounds and the electrolyte, the charge-discharge cycle can be improved.

Hereinafter, the present invention will be explained in further detail with reference to Examples thereof.

EXAMPLES

This example represents the case where $LiCoO_2$ was used for the positive electrode active material and $TiO_2$ was used for the negative electrode active material. The examples used the positive electrode, the negative electrode and the electrolyte that were prepared in the following way, respectively. The battery had an outer diameter of 6.8 mm and a thickness of 2.1 mm. FIG. 1 is a sectional view of this battery.

The positive electrode in this example was produced in the following way. A positive electrode active material was pulverized. Graphite as the conductive agent and polyacrylic acid as the binder were then added to the pulverizate in a proportion of $LiCoO_2$:graphite:polyacrylic acid=88.5:9: 2.5 to give a positive electrode compound. Next, this positive electrode compound was pressure-molded to a pellet having a diameter of 4.05 mm at a pressure of 2 ton/cm$^2$. The positive electrode pellet 101 so obtained was bonded and integrated (into a positive electrodeunit) to a positive electrode case 103 using an electrode current collector 102 consisting of a conductive resin adhesive containing carbon, and the unit was thereafter heat-treated at a pre-determined temperature for 8 hours in a predetermined atmosphere. After this heat-treatment, the positive electrode unit was transferred to a dry atmosphere.

The negative electrode was produced in the following way. The pulverizate of a negative electrode active material was used as an active material of an active electrode. A negative electrode compound was prepared by adding graphite as the conductive agent and polyacrylic acid as the binder to this active material in a weight proportion of 70.5:21.5:7. The compound was pressure-molded into a pellet having a diameter of 4.05 mm at a pressure of 2 ton/cm$^2$. Thereafter, the negative electrode pellet 104 so obtained was bonded and integrated (into a negative electrode unit) to a negative electrode case 105 using an electrode current collector 112 consisting of a conductive resin adhesive using carbon as a conductive filler, and the unit was heat-treated at a predetermined temperature for 8 hours in a predetermined atmosphere. After this heat-treatment, the negative electrode unit was transferred to a dry atmosphere. After a gasket 108 was put, a separator 109 was placed on the negative electrode pellet 104.

An electrolyte 107 was prepared by dissolving 1 mol/l of a supporting salt selected from $LiBF_4$, $LiPF_6$ and $LiCF_3SO_3$ in a mixed solvent of EC, γBL and PC having a predetermined volume ratio. About a half of 20 μL of this electrolyte 107 was added to each of the positive and negative electrode unit. Thereafter, the positive electrode unit and the negative electrode unit were arranged one upon another, and were sealed by a press machine having a mold for curling inward the open portion of the positive electrode case 103 into the final shape of the battery. The gasket 108 used was made of PPS. The separator 109 used was made of a glass fiber.

Polyvinylidene fluoride was used as the binder only when $LiNiO_2$ was used for the positive electrode.

In order to examine whether or not the batteries so produced could withstand a reflow temperature, a heating test was carried out by conducting preliminary heating at 180° C. for 10 minutes and heating at 240° C. for one minute. Thereafter, the internal resistance was measured, and the capacity as well as the cycle characteristics were evaluated. The internal resistance was measured by an AC method (1 kHz). The capacity and the cycle characteristics were measured by repeating the charging-discharging test of charging at 100 μA constant current, constant voltage retention at 3.0 V for 24 hours, discharging at 50 μA constant current and a termination voltage of 0.8 V.

The results are tabulated in Table 1. In this Table 1, ⊚ represents excellent characteristics, ○ represents those characteristics which could be used practically without problem, Δ represents the case where the battery underwent swelling to a certain extent and the internal resistance became high, and × represents those characteristics which involved problems and could not be used practically.

TABLE 1

| Example No. | positive electrode active material | heat-treatment | negative electrode active material | heat-treatment | electrolyte non-aques solvent (volume ratio) |  |  |  | supporting salt (mol/L) |  |  | characteristics after application of reflow temperature |  |  |
|---|---|---|---|---|---|---|---|---|---|---|---|---|---|---|
|  |  |  |  |  | EC | γBL | PC | DME | $LiBF_4$ | $LiPF_6$ | $LiCF_3SO_3$ | capacity | cycle characteristics | internal resistance Ω |
| 1 | $LiCoO_2$ | 250° C. vacuum | $TiO_2$ | 250° C. vacuum | 1 | 1 |  |  | 1 |  |  | ⊚ | ○ | 69 |
| 2 | $LiCoO_2$ | 250° C. vacuum | $TiO_2$ | 250° C. vacuum | 1 | 1 |  |  |  | 1 |  | ⊚ | ○ | 70 |
| 3 | $LiCoO_2$ | 250° C. vacuum | $TiO_2$ | 250° C. vacuum | 1 | 1 |  |  |  |  | 1 | ○ | ○ | 68 |
| 4 | $LiCoO_2$ | 250° C. vacuum | $TiO_2$ | 250° C. vacuum | 1 |  | 1 |  | 1 |  |  | ○ | ○ | 71 |
| 5 | $LiCoO_2$ | 250° C. vacuum | $TiO_2$ | 250° C. vacuum | 1 |  | 1 |  |  | 1 |  | ○ | ○ | 68 |
| 6 | $LiCoO_2$ | 250° C. vacuum | $TiO_2$ | 250° C. vacuum | 1 |  | 1 |  |  |  | 1 | ○ | ○ | 67 |

TABLE 1-continued

| Example No. | positive electrode active material | heat-treatment | negative electrode active material | heat-treatment | non-aques solvent (volume ratio) | | | | supporting salt (mol/L) | | | capacity | cycle charac-teristics | internal resistance Ω |
|---|---|---|---|---|---|---|---|---|---|---|---|---|---|---|
| | | | | | EC | γBL | PC | DME | LiBF$_4$ | LiBF$_6$ | LiCF$_3$SO$_3$ | | | |
| 7 | LiCoO$_2$ | 250° C. vacuum | Li$_4$Ti$_5$O$_{12}$ | 250° C. vacuum | 1 | 1 | | | 1 | | | ○ | ⊚ | 65 |
| 8 | LiCoO$_2$ | 250° C. vacuum | Li$_4$Ti$_5$O$_{12}$ | 250° C. vacuum | 1 | 1 | | | | 1 | | ○ | ⊚ | 62 |
| 9 | LiCoO$_2$ | 250° C. vacuum | Li$_4$Ti$_5$O$_{12}$ | 250° C. vacuum | 1 | 1 | | | | | 1 | ○ | ⊚ | 63 |
| 10 | LiCoO$_2$ | 250° C. vacuum | Li$_4$Ti$_5$O$_{12}$ | 250° C. vacuum | 1 | | 1 | | 1 | | | ○ | ⊚ | 65 |
| 11 | LiCoO$_2$ | 250° C. vacuum | Li$_4$Ti$_5$O$_{12}$ | 250° C. vacuum | 1 | | 1 | | | 1 | | ○ | ⊚ | 63 |
| 12 | LiCoO$_2$ | 250° C. vacuum | Li$_4$Ti$_5$O$_{12}$ | 250° C. vacuum | 1 | | 1 | | | | 1 | ○ | ⊚ | 62 |
| 13 | LiNiO$_2$ | 250° C. vacuum | TiO$_2$ | 250° C. vacuum | 1 | 1 | | | 1 | | | ⊚ | ○ | 75 |
| 14 | LiNiO$_2$ | 250° C. vacuum | TiO$_2$ | 250° C. vacuum | 1 | 1 | | | 1 | | | ⊚ | ○ | 74 |
| 15 | LiNiO$_2$ | 250° C. vacuum | Li$_4$Ti$_5$O$_{12}$ | 250° C. vacuum | 1 | 1 | | | 1 | | | ○ | ⊚ | 79 |
| 16 | LiNiO$_2$ | 250° C. vacuum | Li$_4$Ti$_5$O$_{12}$ | 250° C. vacuum | 1 | 1 | | | 1 | | | ○ | ⊚ | 80 |
| 17 | LiMn$_2$O$_4$ | 250° C. open air | TiO$_2$ | 250° C. vacuum | 1 | 1 | | | 1 | | | ○ | ○ | 70 |
| 18 | LiMn$_2$O$_4$ | 250° C. open air | TiO$_2$ | 250° C. vacuum | 1 | 1 | | | 1 | | | ○ | ○ | 68 |
| 19 | LiMn$_2$O$_4$ | 250° C. open air | Li$_4$Ti$_5$O$_{12}$ | 250° C. vacuum | 1 | 1 | | | 1 | | | ○ | ○ | 67 |
| 20 | LiMn$_2$O$_4$ | 250° C. open air | Li$_4$Ti$_5$O$_{12}$ | 250° C. vacuum | 1 | 1 | | | 1 | | | ○ | ○ | 69 |
| 21 | Li$_2$CoNiO$_4$ | 250° C. vacuum | TiO$_2$ | 250° C. vacuum | 1 | 1 | | | 1 | | | ⊚ | ○ | 76 |
| 22 | Li$_2$CoNiO$_4$ | 250° C. vacuum | TiO$_2$ | 250° C. vacuum | 1 | 1 | | | 1 | | | ⊚ | ○ | 81 |
| 23 | Li$_2$CoNiO$_4$ | 250° C. vacuum | Li$_4$Ti$_5$O$_{12}$ | 250° C. vacuum | 1 | 1 | | | 1 | | | ○ | ⊚ | 79 |
| 24 | Li$_2$CoNiO$_4$ | 250° C. vacuum | Li$_4$Ti$_5$O$_{12}$ | 250° C. vacuum | 1 | 1 | | | 1 | | | ○ | ⊚ | 88 |
| 25 | LiCoO$_2$ | 250° C. vacuum | MoO$_2$ | 250° C. vacuum | 1 | 1 | | | 1 | | | ○ | ⊚ | 85 |
| 26 | LiCoO$_2$ | 250° C. vacuum | MoO$_{2.5}$ | 250° C. vacuum | 1 | 1 | | | 1 | | | ○ | ⊚ | 78 |
| 27 | LiCoO$_2$ | 250° C. vacuum | MoO$_{2.55}$ | 250° C. vacuum | 1 | 1 | | | 1 | | | ⊚ | ⊚ | 80 |
| 28 | LiCoO$_2$ | 250° C. vacuum | MoO$_{2.75}$ | 250° C. vacuum | 1 | 1 | | | 1 | | | ⊚ | ○ | 84 |
| 29 | LiCoO$_2$ | 250° C. vacuum | MoO$_3$ | 250° C. vacuum | 1 | 1 | | | 1 | | | ⊚ | ○ | 78 |
| Comp. Example 1 | LiCoO$_2$ | 250° C. vacuum | TiO$_2$ | 250° C. vacuum | 1 | 1 | 1 | | 1 | | | x | x | 558 |
| Comp. Example 2 | LiCoO$_2$ | no heat-treatment | TiO$_2$ | no heat-treatment | 1 | 1 | | | 1 | | | Δ | Δ | 250 |

Examples 1 to 6

All these examples used LiCoO$_2$ for the positive electrode and TiO$_2$ for the negative electrode. The internal resistance remained unchanged after the application of the reflow temperature and was excellent. The capacity reached 3.5 mAh in Examples 1 and 2, at least 3 mAh for Examples 3 to 6, and was excellent. The electrolyte prepared by adding 1 mol/L of LiBF$_4$ or LiPF$_6$ to EC:γBL=1:1 exhibited the excellent result. Particularly, the electrolyte using LiBF$_4$ for the supporting salt exhibited the excellent preservation property. This was presumably because LiBF$_4$ had the resistance to invasion of the moisture into the battery during preservation. Taken altogether, EC:γBL=1:1, LiBF$_4$ (1 mol/L) was the best for the electrolyte.

Examples 7 to 12

All these examples used LiCoO$_2$ for the positive electrode and Li$_4$Ti$_5$O$_{12}$ for the negative electrode. The internal resistance remained unaltered after the application of the reflow temperature, and was excellent. The capacity was about 2.5 mAh in all the batteries. As to the cycle, degradation hardly occurred due to excellent cycle characteristics inherent to Li$_4$Ti$_5$O$_{12}$. The electrolyte exhibited substantially the same tendency as in Examples 1 to 6.

Examples 13 to 16

All these examples used LiNiO$_2$ for the positive electrode and TiO$_2$ or Li$_4$Ti$_5$O$_{12}$ for the negative electrode. Since LiNiO$_2$ was not much compatible to the moisture, polyvinylidene fluoride was used as the binder.

The results obtained by using only the electrolyte EC:γBL=1:1 and LiBF$_4$ (1 mol/L), that exhibited the excellent results in Examples 1 to 12, were shown, and excellent characteristics could be obtained, too.

Examples 17 to 20

All these examples used LiMn$_2$O$_4$ for the positive electrode and TiO$_2$ or Li$_4$Ti$_5$O$_{12}$ for the negative electrode. The results obtained by using only the electrolyte EC:γBL=1:1, LiBF$_4$ (1 mol/L), that exhibited the good results in Examples 1 to 12, were shown. LiMn$_2$O$_4$ exhibited the excellent characteristics without any practical problem, though it was inferior to cobalt and nickel type oxides in the capacity and in the cycle.

Examples 21 to 24

All these examples used Li$_2$CoNiO$_4$ for the positive electrode and TiO$_2$ or Li$_4$Ti$_5$O$_{12}$ for the negative electrode. Excellent characteristics could be obtained by using the composite compounds of cobalt and nickel.

Examples 25 to 29

All these example used LiCO$_2$ for the positive electrode and molybdenum oxides for the negative electrode.

They used the following molybdenum oxides.

(1) MoO$_2$

A commercially available reagent of a special grade was used as such.

(2) MoO$_{2.5}$

After MoO$_2$:MoO$_3$=1:1 were mixed in a mortar, the mixture was fired at 700° C. for 12 hours in nitrogen.

(3) MoO$_{2.66}$

MoO$_2$:MoO$_3$=1:2 were fired under the same condition as described above.

(4) MoO$_{2.75}$

MoO$_2$:MoO$_3$=1:3 were fired under the same condition as described above.

(5) MoO$_3$

A commercially available reagent of a special grade was used as such.

It was found that the manganese oxide having an oxygen number close to 2 (MoO$_2$) exhibited good cycle characteristics, but the capacity was rather small, and the oxide having an oxygen number close to 3 (MoO$_3$) had a large capacity, though the cycle characteristics were not so good, on the contrary. The battery voltage was close to 3 V when the oxygen number was 2, and close to 1.5 V when the oxygen number was 3. Therefore, the battery voltage could be controlled by selecting the oxygen number between 2 and 3.

Comparative Example 1

This example represented the case where LiCoO$_2$ was used for the positive electrode and TiO$_2$ for the negative electrode, and 1,2-dimethoxyethane (DME) as a solvent having a low boiling point was added to the electrolyte. Upon application of the reflow temperature, DME was boiled and exerted presumably the adverse influences on the battery characteristics.

Comparative Example 2

This example represented the case where LiCoO$_2$ was used for the positive electrode and TiO$_2$, for the negative electrode, and the heat-treatment was not carried out. The battery characteristics got deteriorated presumably because modification of the electrode by the heat-treatment was not effected and the electrolyte did not soak into the electrode.

In the examples of the present invention, LiMn$_2$O, was heat-treated in open air. It was not preferred to shift the oxygen number of manganese of this compound to the reduction side. Therefore, it was necessary to conduct heat-treatment in open air or in an atmosphere of excessive oxygen.

Heat-treatment was conducted for the molybdenum oxide type in vacuum. Since there was the possibility that the oxygen number would increase due to heat-treatment in the manganese oxides other than MoO$_3$, the heat-treatment had to be conducted in vacuum or in an inert gas atmosphere.

Heat-treatment of other active materials used in the examples could be conducted in vacuum or in other atmospheres without any problem.

Figure 2:
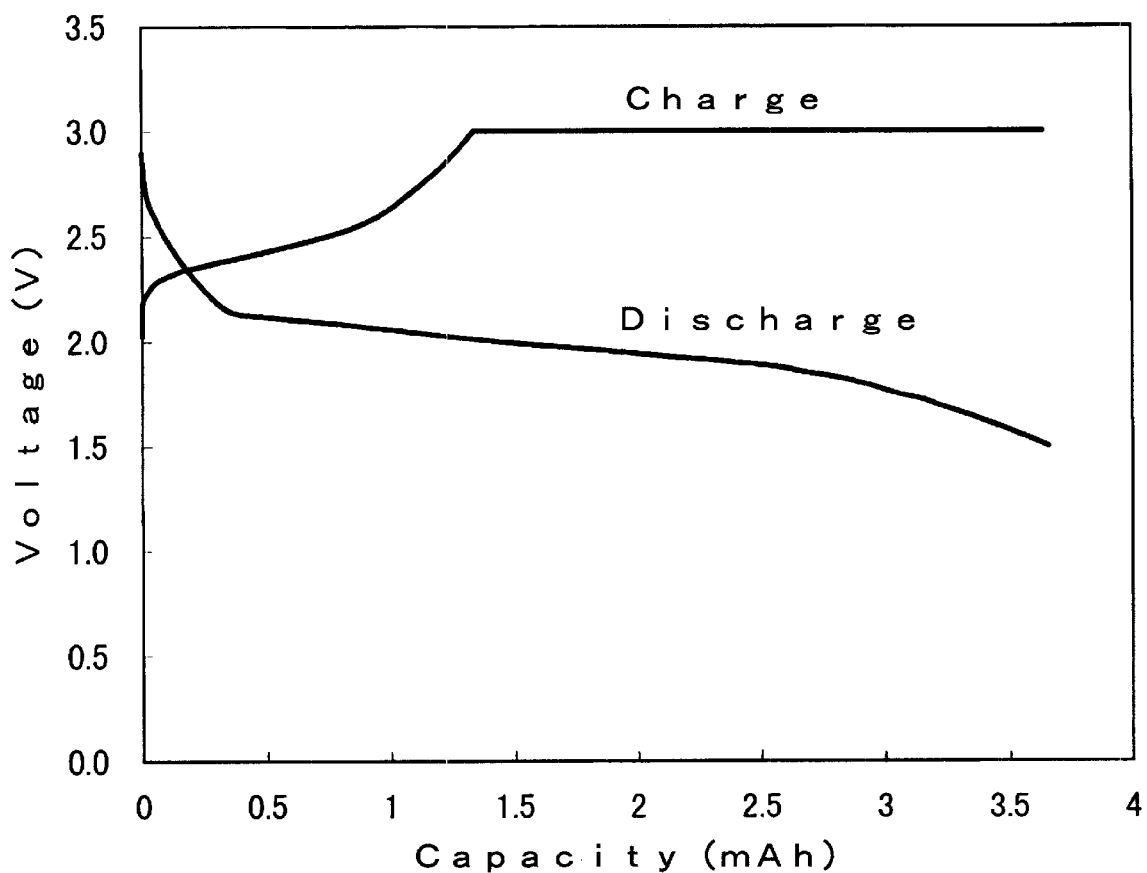
FIG. 2 is a graph showing charge-discharge characteristics of a coin type lithium secondary battery using $LiCoO_2$ for a positive electrode active material and $TiO_2$ for a negative electrode active material under the condition of charging: 100 μA constant current, constant voltage retention: 3.0 V for 24 hours, discharge: 50 μA constant current, and termination voltage: 0.8 V.
Figure 3:
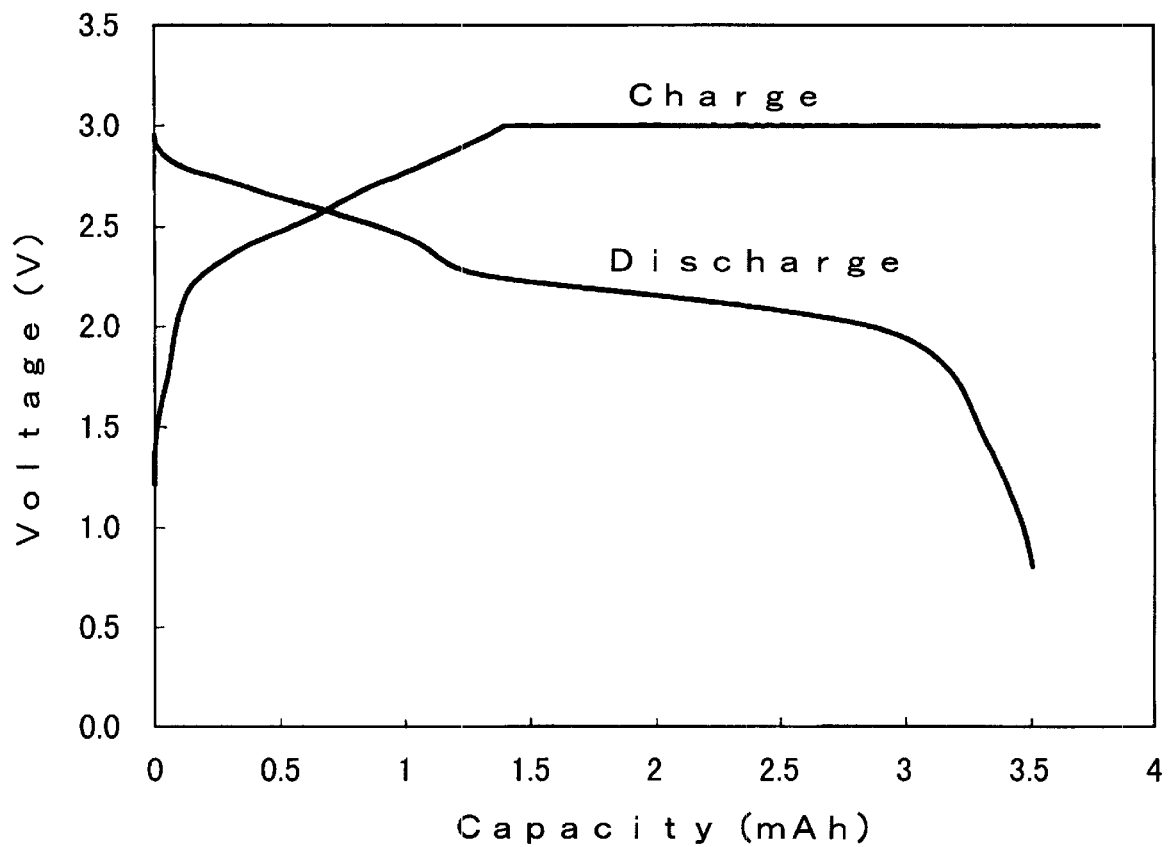
FIG. 3 is a graph showing charge-discharge characteristics of a coin type lithium secondary battery using $LiCoO_2$ for the positive electrode active material and $MoO_2$ for the negative electrode active material under the condition of charge: 100 μA constant current, constant voltage retention: 3.0 V for 24 hours, discharge: 50 μA constant current and a termination voltage: 0.8 V.

FIG. 2 shows a charge-discharge curve of example 1 as a typical example, and FIG. 3 shows a charge-discharge curve of Example 25. Charging was conducted at 100 μA constant current, constant voltage retention at 3.0 C for 24 hours and discharging was conducted at 50 μA constant current and termination voltage of 0.8 V.

All the active materials used in the examples had a mean particle size of at least 5 μm and did not contain more than 50% of particle having a particle size of smaller than 5 μM.

EFFECT OF THE INVENTION

As described above in detail, the present invention can drastically improve stability at the reflow temperature by using LiCoO$_2$, LiNiO$_2$ or LiMn$_2$O$_4$, as the oxide containing mobile lithium, for the positive electrode and the anatase type titanium oxide, the spinel type lithium titanate or the molybdenum oxide for the negative electrode, and by heat-treating the electrodes at 200 to 450° C.

The present invention can also improve remarkably reliability of the battery after reflow soldering by reducing the amount of the dust and selecting and combining the optimum electrolyte, the heat-resistant PPS gasket, and so forth.

Among the binders used for the electrodes, polyacrylic acid is most effective, and heat-treatment allows easy permeation of the electrolyte using the solvent having a high viscosity such as ethylene carbonate (EC), γ-butyrolactone (γBL), and the like.

The molybdenum oxides expressed by the general formula Moo$_x$ (where $2 \leq x \leq 3$) can regulate the voltage by changing the x value. In consequence, the battery design can be so made as to satisfy the needs of battery users.

What is claimed is:

1. A non-aqueous electrolyte secondary battery capable of withstanding a reflow temperature, comprising: a positive electrode having a conductive material, a binder, and an electrode active material selected from the group consisting of LiCoO$_2$, LiNiO$_2$ and LiMn$_2$O$_4$; a negative electrode having a conductive material, a binder and an electrode active material selected from the group consisting of a titanium oxide having an anatase structure, lithium titanate having a spinel structure and a molybdenum oxide; an electrolyte having a supporting salt and a non-aqueous solvent having a boiling point greater than 200° C.; a gasket comprised of a material having a heat deformation temperature greater than 230° C.; and a separator disposed between the positive electrode and the negative electrode and comprised of a material having a heat deformation temperature greater than 230° C.; wherein at least one of the positive electrode and the negative electrode comprises an electrode heat-treated to a temperature of 250° C. to 450° C. for deactivating a thermally active portion of each of the conductive material, the binder and the electrode active material thereof.

2. A non-aqueous electrolyte secondary battery according to claim 1; wherein the molybdenum oxide is represented by the composition formula $MoO_x$ where x satisfies $2 \leq x \leq 3$.

3. A non-aqueous electrolyte secondary battery according to claim 1; wherein less than 50% of particles constituting the electrode active material of one of the positive electrode and the negative electrode has a mean particle diameter smaller than 5 μm.

4. A non-aqueous electrolyte secondary battery according to claim 1; wherein the supporting salt of the electrolyte contains fluorine.

5. A non-aqueous electrolyte secondary battery according to claim 1; wherein the separator is made of a material selected from the group consisting of fiber glass and a resin.

6. A non-aqueous electrolyte secondary battery according to claim 5; wherein the resin comprises polyphenylene sulfide.

7. A non-aqueous electrolyte secondary battery according to claim 1; wherein the gasket is made of a resin.

8. A non-aqueous electrolyte secondary battery according to claim 7; wherein the resin comprises polyphenylene sulfide.

9. A non-aqueous electrolyte secondary battery according to claim 1; wherein the binder of each of the positive and negative electrodes comprises polyacrylic acid.

10. A non-aqueous electrolyte secondary battery according to claim 1; wherein the non-aqueous solvent comprises a composition containing ethylene carbonate and γ-butyrolactone.

11. A non-aqueous electrolyte secondary battery according to claim 1; wherein the supporting salt comprises lithium borofluoride.

12. A non-aqueous electrolyte secondary battery according to claim 1; wherein the gasket is made of a material selected from the group consisting of polyethylene terephthalate, polyamide, polyether ketone resin, polyether ether ketone resin, polyarylate resin, polybutylene terephthalate resin, polycyclohexanedimethylene terephthalate resin, polyethersulfone resin, polyamino-bis-maleimide resin and polyetherimide resin.

13. A non-aqueous electrolyte secondary battery according to claim 1; wherein the gasket comprises a material selected from the group consisting of glass fiber, mica whisker and ceramic dust.

14. A non-aqueous electrolyte secondary battery comprising:

a positive electrode having a conductive material, a binder and an electrode active material, the positive electrode being heat-treated to a temperature of 250° C. to 450° C. for deactivating a thermally active portion of each of the conductive material, the binder and the electrode active material thereof;

a negative electrode having a conductive material, a binder and an electrode active material, the negative electrode being heat-treated to a temperature of 250° C. to 450° C. for deactivating a thermally active portion of each of the conductive material, the binder and the electrode active material thereof;

an electrolyte having a supporting salt and a non-aqueous solvent having a boiling point greater than 200° C.;

a gasket surrounding the positive and negative electrodes and comprised of a material having a heat deformation temperature greater than 230° C.; and a separator disposed between the positive electrode and the negative electrode and comprised of a material having a heat deformation temperature greater than 230° C.

15. A non-aqueous electrolyte secondary battery according to claim 14; wherein the electrode active material of the positive electrode is selected from the group consisting of $LiCoO_2$, $LiNiO_2$ and $LiMn_2O_4$.

16. A non-aqueous electrolyte secondary battery according to claim 14; wherein the electrode active material of the negative electrode is selected from the group consisting of a titanium oxide having an anatase structure, lithium titanate having a spinel structure and a molybdenum oxide.

17. A non-aqueous electrolyte secondary battery according to claim 14; wherein the supporting salt of the electrolyte contains fluorine.

18. A non-aqueous electrolyte secondary battery according to claim 14; wherein the separator is made of a material selected from the group consisting of fiber glass and a resin.

19. A non-aqueous electrolyte secondary battery according to claim 14; wherein the gasket is made of a resin.

20. A non-aqueous electrolyte secondary battery according to claim 14; wherein the binder of each of the positive and negative electrodes comprises polyacrylic acid.

21. A non-aqueous electrolyte secondary battery according to claim 14; wherein the non-aqueous solvent comprises a composition containing ethylene carbonate and γ-butyrolactone.

22. A non-aqueous electrolyte secondary battery according to claim 14; wherein the supporting salt comprises lithium borofluoride.

23. A non-aqueous electrolyte secondary battery according to claim 14; wherein the gasket is made of a material selected from the group consisting of polyethylene terephthalate, polyamide, polyether ketone resin, polyether ether ketone resin, polyarylate resin, polybutylene terephthalate resin, polycyclohexanedimethylene terephthalate resin, polyethersulfone resin, polyamino-bis-maleimide resin and polyetherimide resin.

24. A non-aqueous electrolyte secondary battery according to claim 14; wherein the gasket comprises a material selected from the group consisting of glass fiber, mica whisker and ceramic dust.

* * * * *